March 2, 1965 — A. SUTHERLAND — 3,171,214
EDUCATIONAL TEACHING AID
Filed May 2, 1961 — 2 Sheets-Sheet 1

March 2, 1965   A. SUTHERLAND   3,171,214
EDUCATIONAL TEACHING AID
Filed May 2, 1961   2 Sheets-Sheet 2

3,171,214
EDUCATIONAL TEACHING AID
Anne Sutherland, Scarsdale, N.Y.
(213 Cleveland St., Pullman, Wash.)
Filed May 2, 1961, Ser. No. 107,240
1 Claim. (Cl. 35—9)

This invention relates to an educational training aid and, more particularly, to a training aid for teaching which can be used, completed and corrected by the student without aid or assistance.

It is known that, with many students, where teaching is accompanied by a physical act performed by the student, the subject being taught is often more quickly grasped and more easily retained. This is particularly true where the physical act is performed competitively.

While many teaching aids have been employed, many of these require participation of a group of students. Although competition within a group is advantageous, it does not permit full use of the individual student's ability. For the student whose ability exceeds that of the group, competition is only at the level of group ability. Where the student's ability is much lower than the group, the group ability may be at such a level that each student quickly loses interest. In either event, some of the advantages are lost.

In addition to group teaching aids, there are aids which are employed for the teaching of individual students. Many of these are defaced in use and must be discarded after only a single use. This adds substantially to the cost and tends to discourage their use. In addition, many of these aids require individual review and correction by a teacher. Correcting the aids is time-consuming. Oftentimes a considerable period of time may elapse before the student is advised of his mark. Knowing this, the challenge to the student is much less than when he knows his mark can be determined immediately.

Among the objects of the instant invention is to provide a simple and efficient teaching aid which, by physical manipulation, can be employed by an individual student in the study of mathematics, history, biology, English, botany, chemistry, physics and many other subjects.

It is also an object of the invention to provide such an aid which is not defaced or mutilated during ordinary use and can be re-used.

A still further object of the invention is to provide such a device which, on completion of the assigned lesson, can be immediately corrected and graded by the student without aid or assistance from the teacher or other students.

In the attached drawings and the accompanying description showing one embodiment of the invention, FIG. 1 is a top plan view of the board or folder employed in the invention;

FIG. 6 is a plan view, similar to FIG. 4, but showing a modified form of the device.

In practicing my invention, I provide a board or card having a recess into which a series of cards are placed in sequence. Each card, with the exception of one, has imprinted, or otherwise permanently affixed to its face, an answer and a question, the answer appearing at one position on the card and the question at another. The question and answer may be differentiated by differences in letter size or style, by color or in some other similar manner. One card, on its face, has, in place of an answer, the word "Start" or other designation to indicate that it is to be the first card used. Each card has, on its back, an indicia to indicate, after the cards are placed face up on the board, whether they were placed in proper sequence.

In using the device, the card marked "Start" is first placed in the proper position on the board. After the card is in position, the question on the card is read by the student and the card, which he feels bears the proper answer, is selected from the group of cards and is positioned on the board adjacent the first card. The student then reads the question on this card, selects from the remaining cards the one bearing the proper answer and positions this card on the board adjacent the second card. This procedure is repeated until all of the cards are positioned on the board.

After all of the cards are on the board, the assembled cards are then viewed from their back. If the cards have been inserted on the board in the proper question and answer sequence, the indicia on the back of the cards will be in proper alignment and it will be apparent that the questions have been answered properly. If, however, a mistake has been made in answering the questions, the indicia will be misaligned indicating a mistake. The number of cards improperly inserted can be readily determined and scored accordingly.

Figure 1:
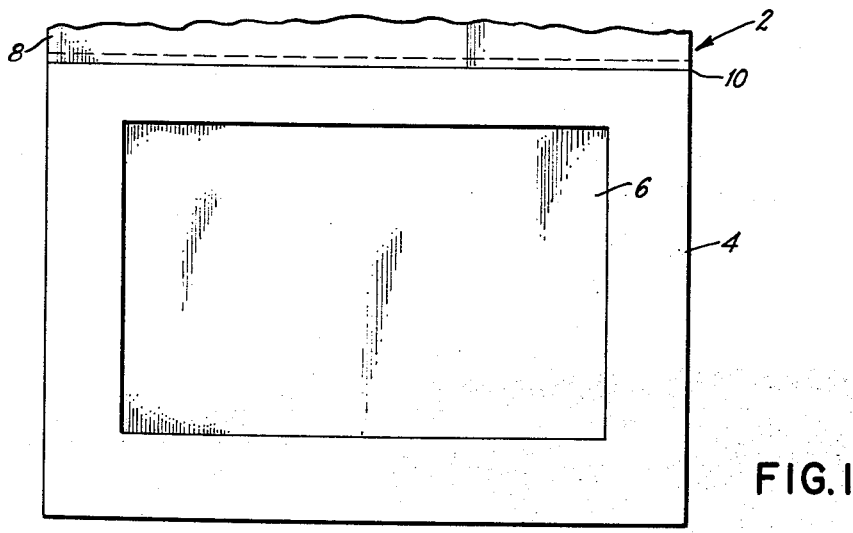

Referring now to the attached drawings, in FIG. 1 there is shown a board, indicated generally 2, of cardboard, laminated paper, wood, metal, plastic or the like. Board 2 includes a base 4 having, at its center, a depressed or recessed area 6, and a top 8 hinged at 10 to base 4. Board 2 is closed by folding top 8 over base 4 to cover area 6.

Figure 2:
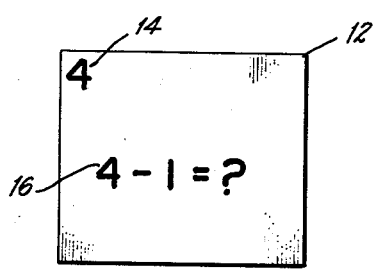
FIG. 2 is a plan view of the face of one of the cards of the invention.
Figure 3:
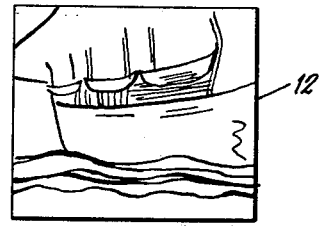
FIG. 3 is a plan view of the back of the card of FIG. 2.

The cards are identical in size and shape, the only difference in the cards being the question and answer imprinted on the face and the indicia on the back. A representative card is shown in FIGS. 2 and 3, the former showing the face of the card and the latter the back. Referring to FIG. 2, the card has, imprinted on its face, an answer, designated 14, and a question, designated 16. The indicia on the back of card 12, as shown in FIG. 3, is a portion of a picture.

Figure 4:
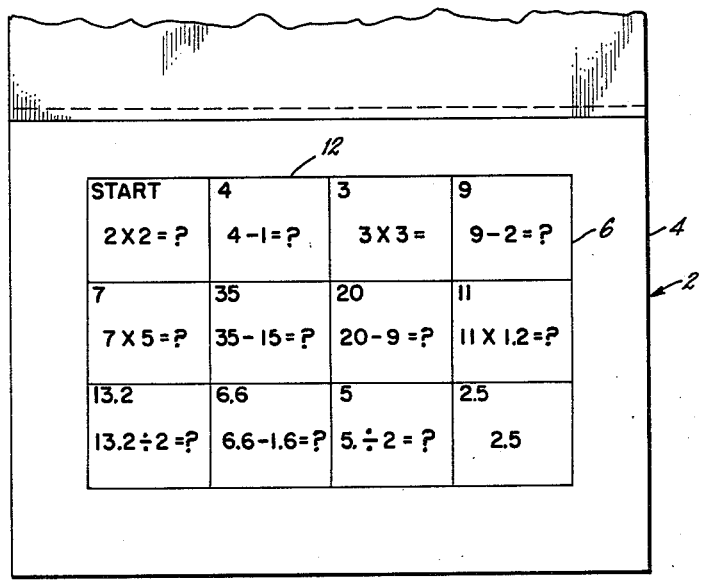

Referring now to FIG. 4, board 2 is shown with the cards 12 in place in proper sequence in recess 6 of base 4. As shown in FIG. 4, the cards are positioned in the board in the intended question and answer sequence. As can be noted in FIG. 4, the card at the upper left-hand corner of the recess has, in place of an answer, the word "Start". This is the first card which is placed in the recess and the cards are thereafter inserted from left to right in rows across recess 6. As can be seen in FIG. 4, card 12, illustrated in FIG. 2, is immediately to the right of the first card, the answer "4" on card 12 answering the question "2×2=?" on the first card. As can also be seen, the card immediately to the right of card 12 has, imprinted thereon, the answer "3" answering the question "4—1=?" on card 12. The following cards, in order, answer the question on the card immediately preceding and, also, contain the question for the answer on the card immediately following.

Figure 5:
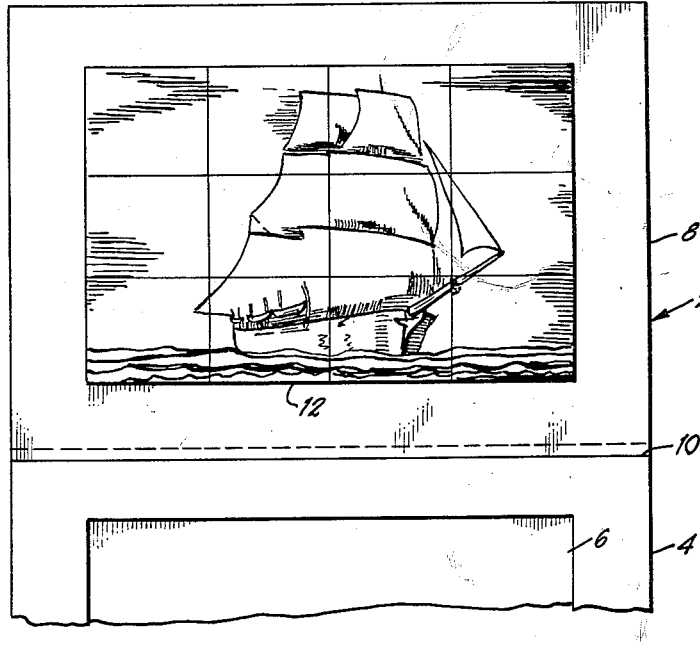
FIG. 5 is a plan view, partially broken away, of the board of FIG. 1 showing the backs of the cards after they have been arranged in their proper sequence, as in FIG. 4, and the cards have been turned over.

In FIG. 5, the cards are shown inverted on top 8. As seen in FIG. 4, the cards are positioned in the recessed area 6 of base 4 in the correct question and answer sequence.

When the cards are then inverted on top 8, the indicia on the back of the respective cards are in alignment with the indicia on the back of adjoining cards. For purposes of illustration, a picture of a boat has been employed as the indicia, a portion of the picture appearing on the back of each card. With the cards in proper sequence, as in FIG. 4, when the back of the cards are viewed, as in FIG. 5, the picture is complete, in the portion of the picture on the back of each card being in its proper position.

In using the teaching aid of the invention, board 2 is positioned with base 4 on a relatively flat surface with top 8 hinged open as shown in FIG. 1. The cards have been shuffled or disarranged and, from the cards, the card bearing the designation "Start" is placed in the upper left-hand corner of the recessed area 6. The question on the card now in position in recess 6 is read out, from the shuffled cards, the card bearing the proper answer is selected and positioned in the recess to the right of the first card. The question on this card is then read and, from the balance of the shuffled cards, the card bearing the answer to the question on this card is selected and positioned to the right of the card. This process is repeated until all of the cards have been inserted in the recessed area 6.

With all of the cards in recessed area 6, top 8 is hinged downwardly over base 4 covering the base and recess 6 holding the cards in place in the recess. The board is then turned over and base 4 lifted, leaving cards 12 in place on top 8. With base 4 hinged open, if the cards have been placed in proper sequence in recessed area 6, the indicia on the back of the cards are in alignment as shown in FIG. 5. However, if the cards have been improperly placed on the board, the indicia on the back of the cards will be misaligned. Thus, after the cards have been placed face up in the recess, the student can easily determine the accuracy of his work by inspecting the backs of the cards.

While the invention has been described in connection with mathematical problems, it is obvious that the invention can be adapted for almost any other subject. For example, questions and answers in history, biology, geography, physics, chemistry, or any subject can be imprinted on the face of the cards with a suitable indicia on the backs of the cards. The indicia might be a part of a picture, map, geometric figure or the like, the only requirement for the indicia being that, when the cards are properly positioned in the recess, the indicia is in alignment and, when improperly positioned, is out of alignment. If desired, the bottom of the recessed area 6 may be made of transparent material. In this manner when top 8 is hinged over base 4, the backs of the cards can be inspected merely by inverting the board.

As is obvious, any number of sets of cards can be prepared and used with a single board. Thus, with appropriate cards, a single board may be employed as a teaching aid for a wide variety of subjects. Even within a single subject, for example mathematics, a plurality of sets of cards may be prepared and used. In their preparation, the questions and answers on the sets could be arranged so that, as the student progresses in the subject, the questions become more difficult. Thus, during the initial phases of the subject, cards with simple questions and answers would be employed. As the student progresses, cards with more difficult questions and answers would be substituted. For ease in identification, the cards may be colored or otherwise marked to readily indicate at what stage of teaching the particular set of cards is to be employed.

In the foregoing description, after the cards have been positioned in the recess of the board, the cards, as an assembly, are turned over to expose their backs. Rather than turning the cards over, the bottom of the recess may be of transparent material so that the cards, after they are positioned in the recess, may be viewed from their back by merely turning the board over.

Figure 6:
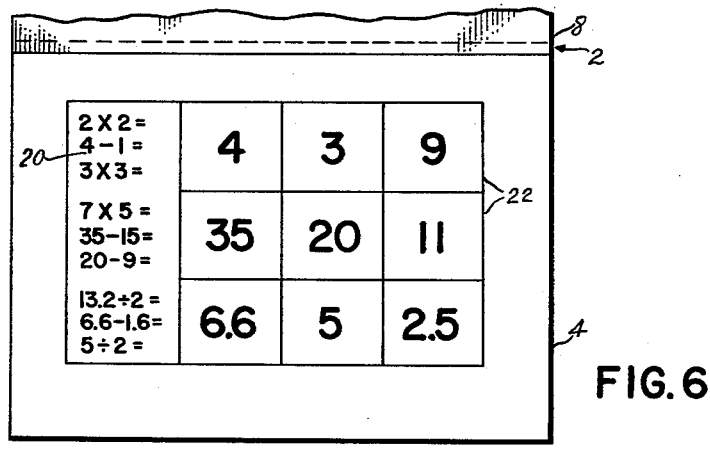
FIGS. 4 and 6 are plan views, partially broken away, of the board of FIG. 1 showing the face of the cards in place in the board and arranged in their proper sequence.

Rather than placing both the questions and answers on the individual cards, the questions may be placed on one card and the answers on other cards. As illustrated in FIG. 6, the card 20 bearing the questions is positioned in the recess and the cards 22 bearing the answers are inserted sequentially in the recess in the order indicated by the questions on the card. The card bearing the questions may be of the same size as those bearing the answers or may be of a different size. In any event, the cards bearing the answers should all be of the same size so that, in placing the answer cards in the recess, there will not be any indication, from the size of the card, of the position the card is to take in the recess.

The indicia, as described above, is visual, the cards when viewed from the back indicating, visually, whether the cards are properly positioned in the recess. For study purposes, the student may position the cards face down in the recess, using the alignment of the picture on the backs of the cards as a guide for properly positioning the cards. After the recess has been filled, the student can turn the assembled cards over, study the questions and correct answers and, in this manner, teach himself the lesson. After studying the questions and correct answers, the cards can then be removed, shuffled and inserted in the recess, face up, and the backs of the cards can be viewed to determine whether the questions have been answered properly.

It is to be understood that the recess in the board, while illustrated as rectangular, may be of any shape so long as the recess accommodates answer cards of equal size.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

An educational training aid comprising a board having a recess on its face and a plurality of cards, each of said cards having an indicia on its back, one of said cards being larger than the other of said cards and having in sequential order on its face a plurality of questions, the remainder of said cards being identical in size and shape and interchangeable with each other, each of said remaining cards having on its face the answer to one of the questions on said larger card, said questions on the face of said larger card, said answer on the face of each of said remaining cards and said indicia on the backs of said cards being so arranged that, when said cards are placed on said board face up with said remainder of said cards following said larger card in correct answer sequence corresponding to the sequence of questions on the face of said larger card, the indicia on the backs of said cards are in substantial alignment, and means on said board for viewing the backs of said cards after said cards have been positioned on said board.

References Cited in the file of this patent
UNITED STATES PATENTS

| | | |
|---|---|---|
| 717,105 | Mansfield | Dec. 30, 1902 |
| 2,483,833 | Levin | Oct. 4, 1949 |
| 2,875,531 | Mansfield | Mar. 3, 1959 |
| 2,954,616 | Mogard | Oct. 4, 1960 |
| 2,984,489 | Parlato | May 16, 1961 |